F. H. HINES.
GEAR ADJUSTER.
APPLICATION FILED JUNE 3, 1919.
1,333,490.
Patented Mar. 9, 1920.
Fig. 1.
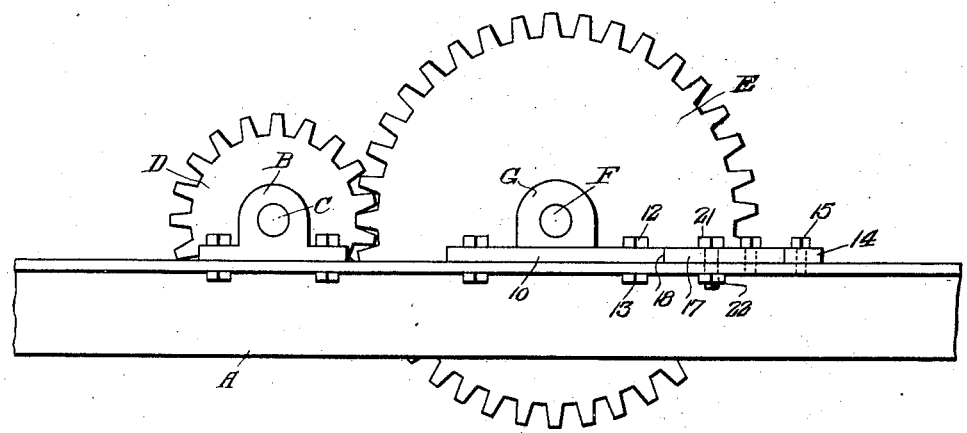
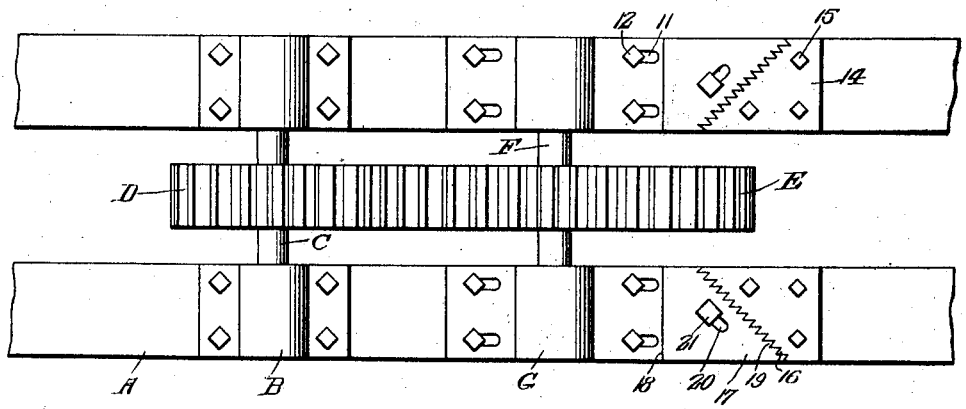
Fig. 2.
Witnesses
J H Crawford
Inventor
F. H. Hines,
By Victor J. Evans
Attorney

UNITED STATES PATENT OFFICE.

FRANK H. HINES, OF BUFFALO, KANSAS.

GEAR-ADJUSTER.

1,333,490.  Specification of Letters Patent.  Patented Mar. 9, 1920.

Application filed June 3, 1919. Serial No. 301,376.

*To all whom it may concern:*

Be it known that I, FRANK H. HINES, a citizen of the United States, residing at Buffalo, in the county of Wilson and State of Kansas, have invented new and useful Improvements in Gear-Adjusters, of which the following is a specification.

This invention relates to devices for adjusting gears when worn and has for its object the provision of means for moving and holding in adjusted position, a plate carrying a bearing with which is associated a spur gear meshing with a similar gear associated with a bearing carried by a stationary plate, the device being especially designed for use upon tractors though being capable of employment in a great many different locations in greatly varying arts.

An important object is the provision of adjusting means of this character which may be quickly and easily operated a greater or less amount, depending upon conditions, whereby intermeshing gears will be properly held in mesh even though they may become greatly worn, the use of the device preventing stripping of the gears.

An additional object is the provision of means of this character which will be simple and inexpensive in manufacture and installation, highly efficient in use, durable in service, and a general improvement in the art.

With the above and other objects and advantages in view, the invention consists in the details of construction to be hereinafter more fully described and claimed, and illustrated in the accompanying drawing, in which—

Figure 1 is a side elevation of my device applied, and

Fig. 2 is a plan view.

Referring more particularly to the drawing, the letter A designates a supporting base upon which are mounted fixed bearings B within which is journaled a shaft C carrying a spur gear D. The other spur gear is designated by the letter E and is carried on a shaft F mounted in bearings G. Under ordinary conditions these bearings would all be fixed and no adjustment between the gears could be possible.

In carrying out my invention I mount the bearings G upon the plate 10 which is adapted to be moved upon the base A and which is provided with a plurality of slots 11 through which extend bolts 12 extending into or through the base A and provided with suitable clamping nuts 13. It will thus be seen that the bearings G carrying one spur gear are movable with respect to the bearings B.

In order that the plate 10 may be moved for effecting proper adjustment of the spur gears, I provide at a point removed from the plate 10, a plate 14 which is securely bolted, as shown at 15, upon the base A and which has its edge toward the plate 10 inclined and provided with serrations 16. Interposed between the plates 14 and 10 is a plate 17 which has one edge straight, as shown at 18, for engagement with the adjacent edge of the plate 10 and which has its other edge inclined for coöperation with the inclined edge of the plate 14. This plate 17 is also provided upon its inclined edge with serrations 19 conformingly engaging within the serrations 16. The plate 17 is furthermore provided with an inclined slot 20 parallel with the inclined edges of the plates 14 and 17 and extending through this slot and into the base A is a bolt 21 having a clamping nut 22.

In the use of the device, when the spur gears become worn, it is first necessary, in order to effect adjustment that the nuts 13 be loosened and the nut 22 also loosened, or which is better, removed. The operator then grasps the plate 17 and moves it so that the next or subsequent serrations in its inclined edge will engage within the next adjacent or subsequent serrations in the inclined edge of the plate 14. When such adjustment is made and the gears are in such condition that they mesh properly, it is merely necessary to draw up on the bolts 12 and 21 to hold the parts in adjusted positions.

From the foregoing description and a study of the drawing, it will be apparent that I have thus provided very simple means for adjusting spur gears so that proper meshing of the gears will be insured and so that stripping thereof at unexpected times will be prevented.

While I have shown and described the preferred embodiment of my invention, it is of course to be understood that I reserve the right to make such changes in the form, construction, and arrangement of parts as will not depart from the spirit of the invention or the scope of the subjoined claim.

Having thus described my invention, I claim:—

In combination with fixed bearings having associated therewith a spur gear, a plate movable with respect to said fixed bearings and carrying bearings with which is associated a spur gear meshing with the first named spur gear, and means for moving said plate to take up wear between said gears, said means comprising a fixed plate spaced from said first named plate and having its edge toward said first named plate inclined and provided with serrations, and an intermediate plate disposed between said first and second named plates and having a straight edge engaging said first named plate and having an inclined edge conforming to the inclined edge of said second named plate and provided with serrations interengaging said first named serrations, said last named plate being provided with a slot parallel with said inclined edges, and a bolt passing through said slot whereby to guide said last named plate in its movement.

In testimony whereof I affix my signature.

FRANK H. HINES.